US010586562B1

(12) United States Patent
Sapozhnikov et al.

(10) Patent No.: US 10,586,562 B1
(45) Date of Patent: Mar. 10, 2020

(54) READ HEAD HAVING SENSORS WITH CONFLICTING DESIGN CHARACTERISTICS

(71) Applicant: Seagate Technology LLC, Cupertino, CA (US)

(72) Inventors: Victor Sapozhnikov, Minnetonka, MN (US); Pavol Krivosik, Eden Prairie, MN (US); Mohammed Shariat Ullah Patwari, Edina, MN (US); Scott Wilson Stokes, Brooklyn Park, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/800,503

(22) Filed: Nov. 1, 2017

Related U.S. Application Data

(60) Provisional application No. 62/445,865, filed on Jan. 13, 2017.

(51) Int. Cl.
*G11B 5/39* (2006.01)

(52) U.S. Cl.
CPC .......... *G11B 5/3951* (2013.01); *G11B 5/3906* (2013.01); *G11B 5/3912* (2013.01); *G11B 2005/3996* (2013.01)

(58) Field of Classification Search
None
See application file for complete search history.

(56) References Cited

U.S. PATENT DOCUMENTS

| 6,185,079 | B1* | 2/2001 | Gill | G11B 5/3954 |
| | | | | 360/324.2 |
| 6,275,363 | B1* | 8/2001 | Gill | G11B 5/3954 |
| | | | | 360/324.2 |
| 9,190,078 | B2 | 11/2015 | Sapozhnikov et al. | |
| 9,190,082 | B2 | 11/2015 | Sapozhnikov et al. | |
| 9,269,383 | B1 | 2/2016 | Hattori et al. | |
| 9,324,342 | B2 | 4/2016 | Sapozhnikov et al. | |
| 9,396,745 | B2 | 7/2016 | Macken et al. | |
| 9,401,161 | B1 | 7/2016 | Jury et al. | |
| 9,552,834 | B1* | 1/2017 | Sapozhnikov et al. | |
| | | | | G11B 5/3951 |
| 9,786,305 | B1* | 10/2017 | Li et al. | G11B 5/3948 |
| 2002/0067577 | A1* | 6/2002 | Beach et al. | G11B 5/3903 |
| | | | | 360/314 |
| 2005/0002131 | A1* | 1/2005 | Gill | G11B 5/3932 |
| | | | | 360/324.12 |
| 2005/0243474 | A1* | 11/2005 | Gill | G11B 5/3932 |
| | | | | 360/324.1 |
| 2005/0280957 | A1* | 12/2005 | Gill | G11B 5/3932 |
| | | | | 360/324.12 |
| 2009/0316309 | A1* | 12/2009 | Partee et al. | G11B 5/3958 |
| | | | | 360/313 |

(Continued)

*Primary Examiner* — Craig A. Renner
(74) *Attorney, Agent, or Firm* — Westman, Champlin & Koehler, P.A.

(57) ABSTRACT

A hybrid dual reader. The hybrid dual reader includes first and second read sensors with conflicting design characteristics. The first read sensor includes at least one signal-to-noise ratio favoring design characteristic. The second read sensor includes at least one pulse width favoring design characteristic. The at least one signal-to-noise ratio favoring design characteristic is in conflict with the at least one pulse width favoring design characteristic.

11 Claims, 13 Drawing Sheets

(56) References Cited

U.S. PATENT DOCUMENTS

| | | | |
|---|---|---|---|
| 2011/0216432 A1* | 9/2011 | Yanagisawa | G11B 5/33 360/315 |
| 2012/0206830 A1 | 8/2012 | Gao et al. | |
| 2013/0314816 A1 | 11/2013 | Gao et al. | |
| 2014/0063644 A1* | 3/2014 | Lou et al. | G11B 5/3945 360/313 |
| 2015/0255092 A1* | 9/2015 | Macken et al. | G11B 5/3951 360/324 |
| 2016/0217813 A1 | 7/2016 | Mashima et al. | |

* cited by examiner

READ HEAD HAVING SENSORS WITH CONFLICTING DESIGN CHARACTERISTICS

CROSS-REFERENCE TO RELATED APPLICATIONS

This application is a non-provisional application of U.S. Provisional Application No. 62/445,865, filed on Jan. 13, 2017, the content of which is hereby incorporated in its entirety.

BACKGROUND

Data storage devices commonly have a recording head that includes a read transducer that reads information from a data storage medium and a write transducer that writes information to a data storage medium.

In magnetic data storage devices such as disc drives, a magnetoresistive (MR) sensor such as a Giant Magnetoresistive (GMR) sensor or a Tunnel Junction Magnetoresistive (TMR) sensor may be employed as the read transducer to read a magnetic signal from the magnetic media. The MR sensor has an electrical resistance that changes in response to an external magnetic field. This change in electrical resistance can be detected by processing circuitry in order to read magnetic data from the adjacent magnetic media.

With ever-increasing levels of recording density in disc drives and a need for faster data transfer speeds, the read transducer needs to have correspondingly better data-reproducing capabilities.

SUMMARY

The present disclosure relates to a hybrid dual reader. The hybrid dual reader includes first and second read sensors with conflicting design characteristics. The first read sensor includes at least one signal-to-noise ratio favoring design characteristic. The second read sensor includes at least one pulse width favoring design characteristic. The at least one signal-to-noise ratio favoring design characteristic is in conflict with the at least one pulse width favoring design characteristic.

Other features and benefits that characterize embodiments of the disclosure will be apparent upon reading the following detailed description and review of the associated drawings.

DETAILED DESCRIPTION OF ILLUSTRATIVE EMBODIMENTS

Embodiments described below relate to a hybrid dual reader. The hybrid dual reader includes first and second read sensors with conflicting design characteristics. However, prior to providing additional details regarding the different embodiments, a description of an illustrative operating environment is provided below.

Figure 1:
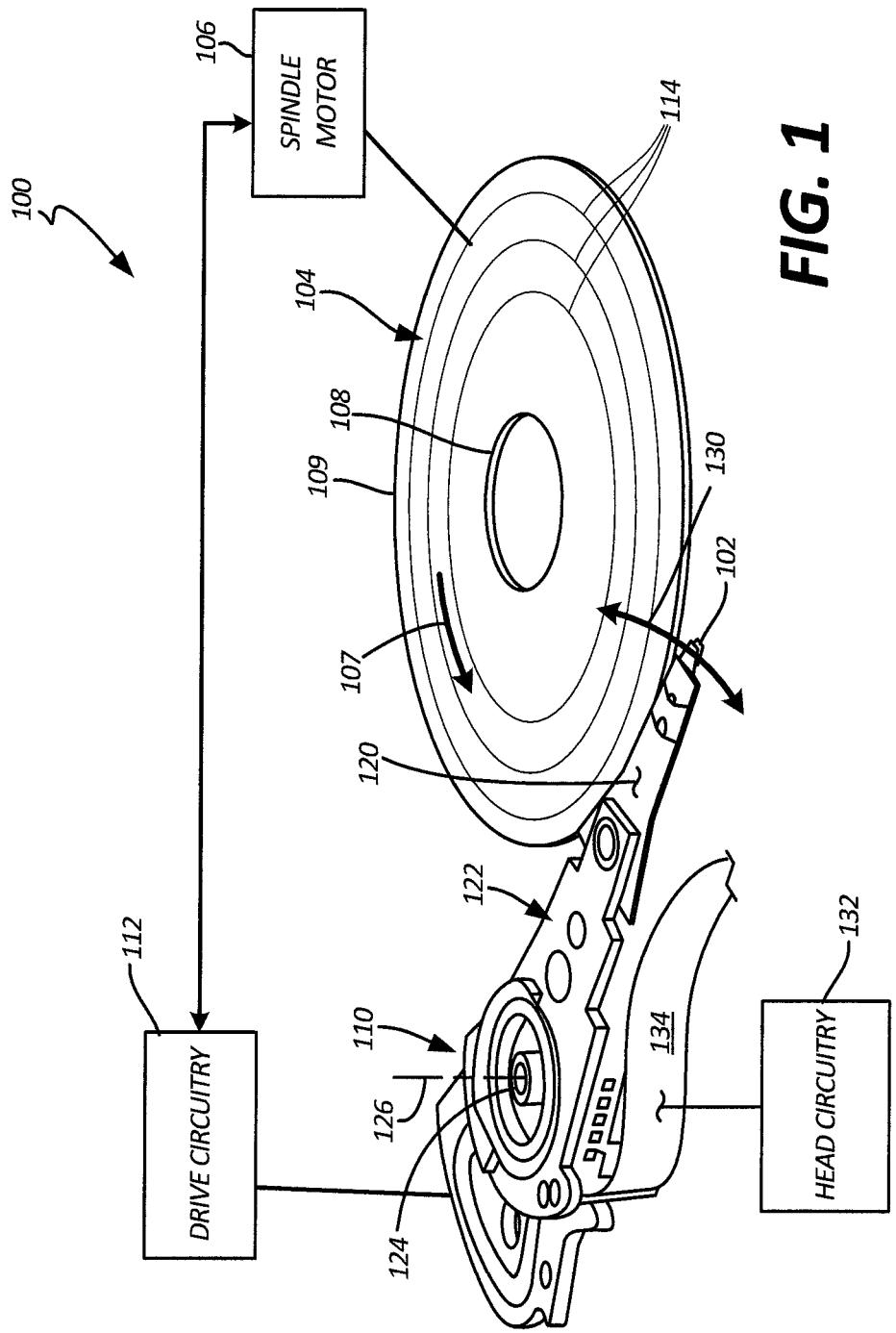
FIG. 1 is a schematic illustration of a data storage system including a data storage medium and a head for reading data from and/or writing data to the data storage medium.

FIG. 1 shows an illustrative operating environment in which certain specific embodiments disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

FIG. 1 is a schematic illustration of a data storage device 100 including a data storage medium and a head for reading data from and/or writing data to the data storage medium. In data storage device 100, head 102 is positioned above storage medium 104 to read data from and/or write data to the data storage medium 104. In the embodiment shown, the data storage medium 104 is a rotatable disc or other magnetic storage medium that includes a magnetic storage layer or layers. For read and write operations, a spindle motor 106 (illustrated schematically) rotates the medium 104 as illustrated by arrow 107 and an actuator mechanism 110 positions the head 102 relative to data tracks 114 on the rotating medium 104 between an inner diameter 108 and an outer diameter 109. Both the spindle motor 106 and actuator mechanism 110 are connected to and operated through drive circuitry 112 (schematically shown). The head 102 is coupled to the actuator mechanism 110 through a suspension assembly which includes a load beam 120 connected to an actuator arm 122 of the mechanism 110 for example through a swage connection. Although FIG. 1 illustrates a single load beam coupled to the actuator mechanism 110, additional load beams 120 and heads 102 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 102 in a cross track direction as illustrated by arrow 130.

The head 102 includes one or more transducer elements (not shown in FIG. 1) coupled to head circuitry 132 through flex circuit 134. Details regarding elements of a head such as 102 are provided below in connection with FIG. 2.

Figure 2:
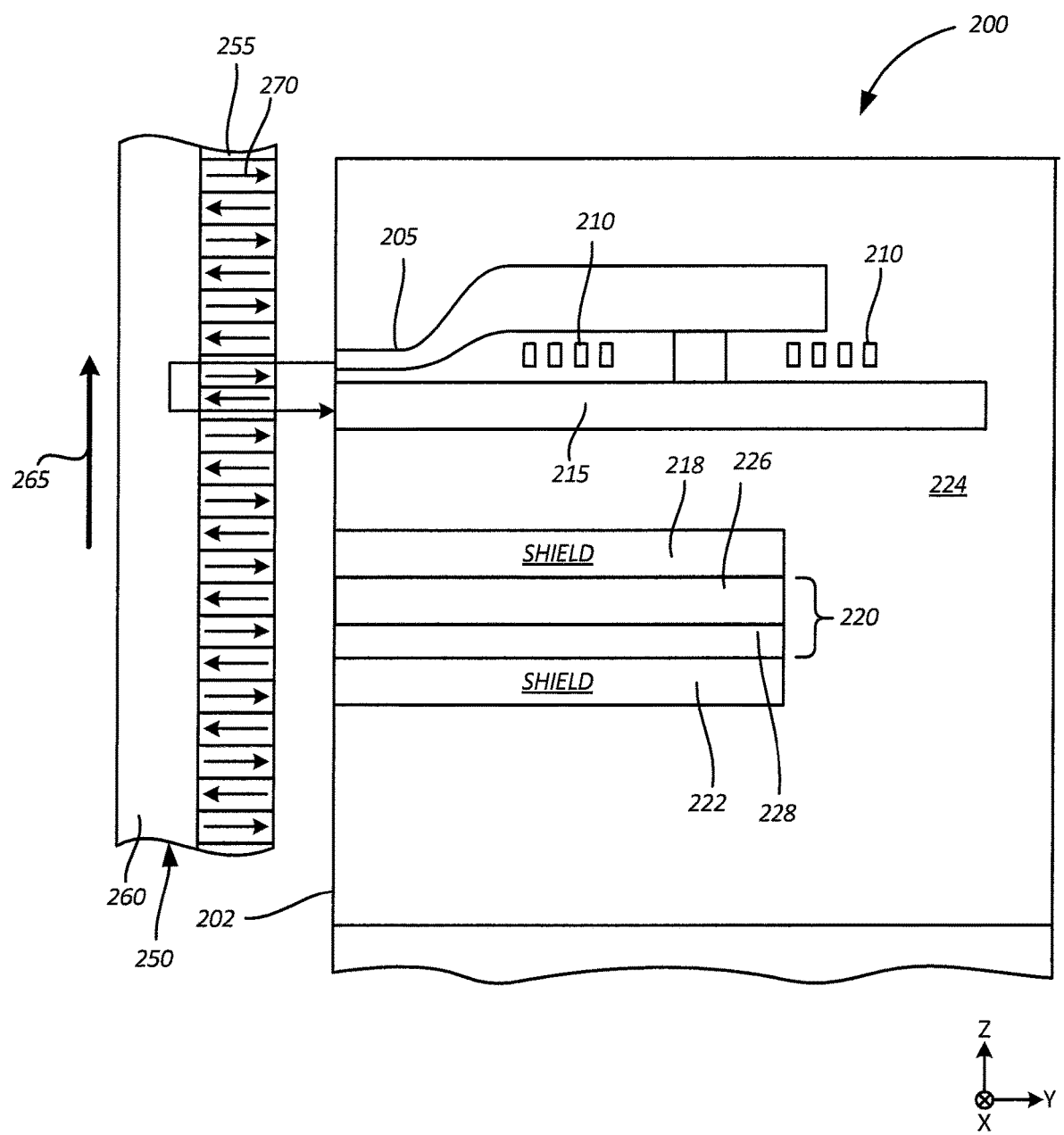
FIG. 2 is a schematic diagram of a cross-section of one embodiment of a recording head that reads from and writes to a storage medium.

FIG. 2 is a schematic diagram showing a cross-sectional view of portions of a recording head 200 and a data storage medium 250 taken along a plane substantially normal to a plane of a bearing surface (for example, an air bearing surface (ABS)) 202 of recording head 200. The recording head elements shown in FIG. 2 are illustratively included in a recording head such as recording head 102 in FIG. 1. Medium 250 is illustratively a data storage medium such as medium 104 in FIG. 1. Those skilled in the art will recognize that recording heads and recording media commonly include other components. Embodiments of the present disclosure are not limited to any particular recording heads or media. Embodiments of the present disclosure may be practiced in different types of recording heads and media.

Recording head 200 includes a write pole 205, a magnetization coil 210, a return pole 215, a top shield 218, a read transducer 220, a bottom shield 222 and a wafer overcoat 224. Storage medium 250 includes a recording layer 255 and an underlayer 260. Storage medium 250 rotates in the direction shown by arrow 265. Arrow 265 is illustratively a direction of rotation such as arrow 107 in FIG. 1.

In an embodiment, electric current is passed through coil 210 to generate a magnetic field. The magnetic field passes from write pole 205, through recording layer 255, into underlayer 260, and across to return pole 215. The magnetic field illustratively records a magnetization pattern 270 in recording layer 255. Read transducer 220 senses or detects magnetization patterns in recording layer 255, and is used in retrieving information previously recorded to layer 255.

Read transducer 220 includes two sensors 226 and 228. In some embodiments, sensors 226 and 228 have conflicting design characteristics. For example, one of sensors 226 and 228 is designed to favor an optimal signal-to-noise ratio (SNR) and the other one of sensors 226 and 228 is designed to favor an optimal readback signal pulse width or PW50, which is a width of a readback signal pulse at 50% of its peak amplitude. For a high recording density, PW50 is preferably as small as possible. This is because a smaller pulse width allows a greater number of pulses (signals) to be written in a same area. On the other hand, a greater value of PW50 causes an interference between adjacent pulses (signals) to produce an error upon reading the signal. This waveform interference deteriorates the error rate. As will be described further below, design requirements for optimal SNR and for optimal PW50 are often in conflict.

In different dual-sensor reader embodiments, magnetic sensors may be stacked along a track direction (i.e., a z-direction in FIG. 2) or a track width direction that is perpendicular to the track direction (i.e., a cross-track direction, which is an x-direction in FIG. 2). A y-direction in FIG. 2 is then defined as a direction that is perpendicular to x and z simultaneously, which is a stripe-height direction. In the embodiment show in FIG. 2, sensors 226 and 228 are stacked along the track direction. Different layers of an example of an individual sensor are shown in FIG. 3A, and FIG. 3B shows an example of a dual-sensor reader including two sensors of the type shown in FIG. 3A.

Figure 3A:
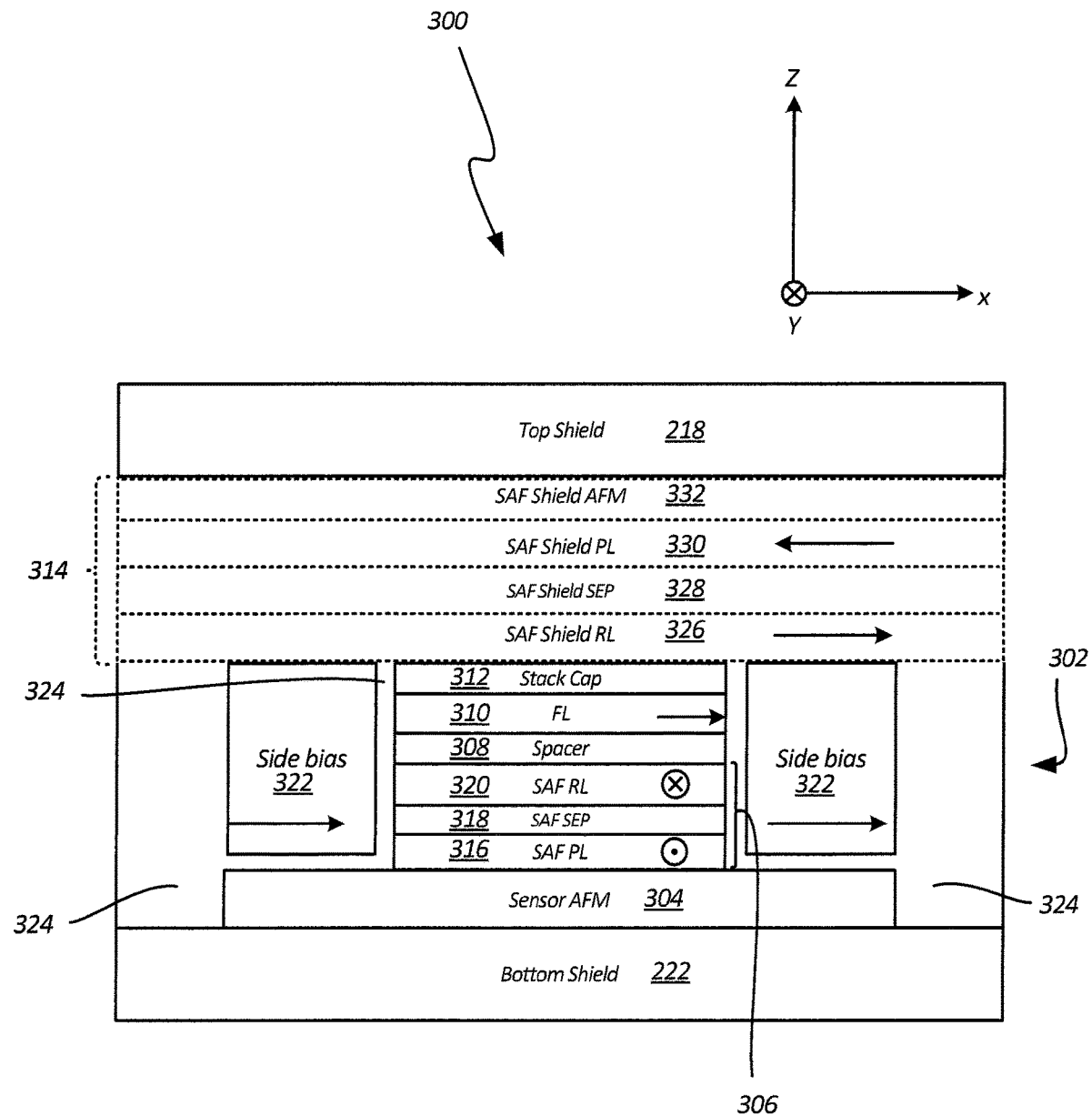
FIG. 3A is a bearing surface view of a magnetic reproducing device having a single read sensor.
Figure 3B:
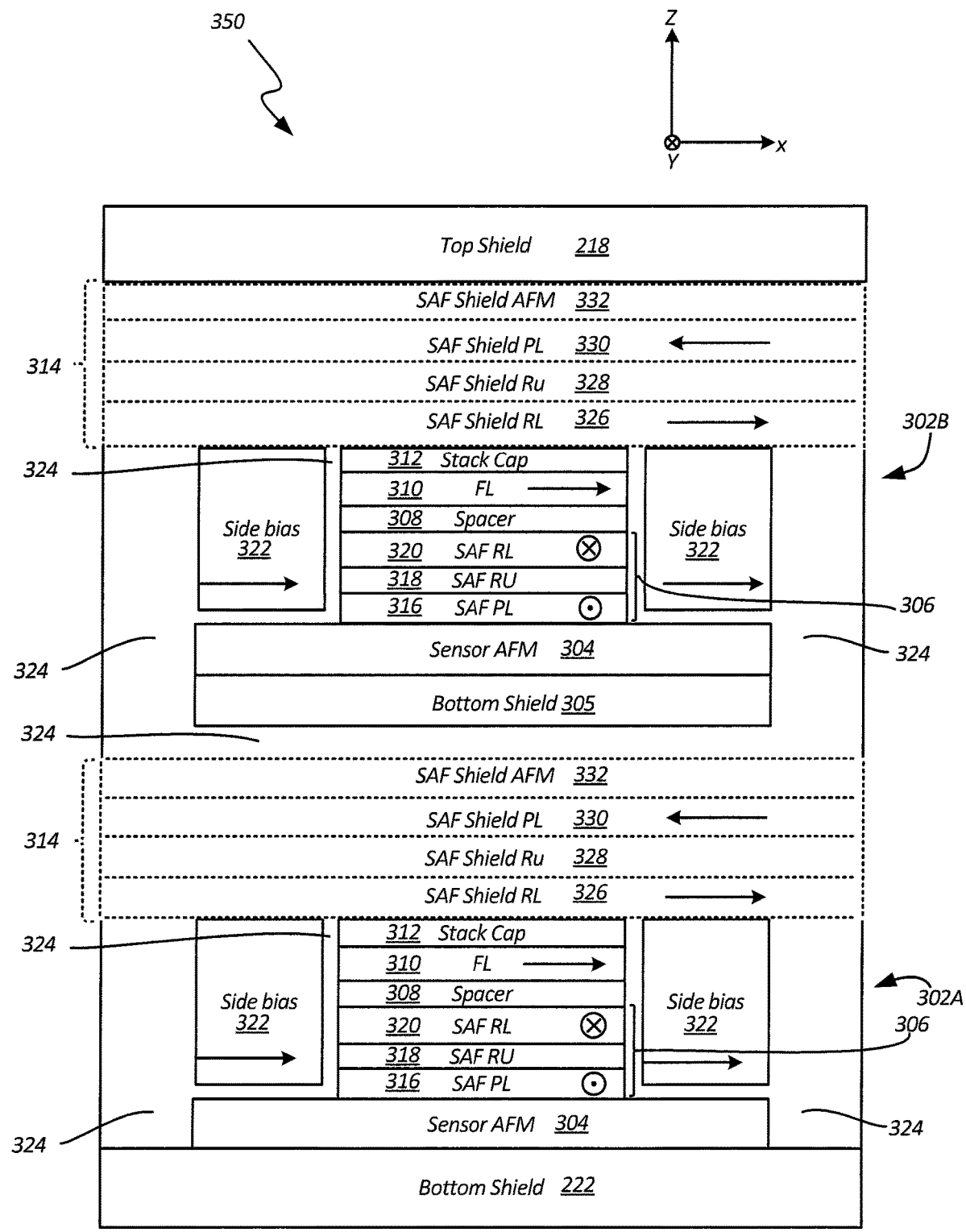
FIG. 3B is a bearing surface view of a magnetic reproducing device having two read sensors of the type shown in FIG. 3A.

FIG. 3A is a schematic block diagram illustrating an example read head 300 including a single magnetoresistive sensor 302. The magnetoresistive sensor 302 is positioned between top shield 218 and bottom shield 222. Top and bottom shields 218 and 222, which may be made of a material having high magnetic permeability, reduce or substantially block extraneous magnetic fields, such as, for example, those from adjacent bits on data discs from impacting the magnetoresistive sensor 302, thus improving the performance of the magnetoresistive sensor 302. In one implementation, the top and bottom shields 218 and 222 permit magnetic fields from the bit directly under magnetoresistive sensor 302 to affect the magnetoresistive sensor 302, and thus be read.

The magnetoresistive sensor 302 includes a plurality of layers including a sensor antiferromagnetic (AFM) layer 304, a sensor stack synthetic antiferromagnetic (SAF) structure 306, a spacer layer 308, a free layer or sensing layer 310 and a stack cap 312. A SAF shielding structure 314 may optionally be included above the stack cap 312. Dashed lines are used to represent elements within structure 314 to indicate that structure 314 is optional.

In the embodiment shown in FIG. 3A, the sensor SAF structure 306 includes a pinned layer 316 a thin separation layer 318, which may comprise a metal such as ruthenium (Ru) in some embodiments, and a reference layer 320. The magnetic moments of each of the pinned layer 316 and the reference layer 320 are not allowed to rotate under magnetic fields in the range of interest (for example, magnetic fields generated by the bits of data stored on the data discs). The magnetic moments of the reference layer 320 and the pinned layer 316 are generally oriented normal to the plane (i.e., the y direction) of FIG. 3A and anti-parallel to each other.

The magnetic moment of the free layer 310 is free to rotate under the influence of an applied magnetic field in a range of interest. The read head 300 further includes side biasing magnets or side shields 322, which produce a magnetic field that biases the free layer 310 with a magnetic moment parallel to the plane of the figure and generally oriented horizontally. This bias prevents the magnetic moment of the free layer 310 from drifting due to, for example, thermal energy, which may introduce noise into the data sensed by the read head 300. The bias is sufficiently small, however, that the magnetic moment of the free layer 310 can change in response to an applied magnetic field, such as a magnetic field of a data bit stored on the data discs. In some embodiments, the side biasing magnets or side shields 322 are formed of soft magnetic material (i.e., material that can be easily magnetized and demagnetized at relatively low magnetic fields). The soft magnetic material may be an alloy comprising Ni and Fe. The magnetoresistive sensor 302 is separated and electrically isolated from the side biasing magnets 322 by an isolation layer 324 including, for example, insulating materials. Isolation layer 324 may also be present in other regions of head 300 as shown in FIG. 3A.

In the embodiment shown in FIG. 3A, optional SAF shielding structure 314 includes a SAF shield reference layer 326, a thin SAF shield separation layer 328, which may comprise a metal such as Ru in some embodiments, a SAF shield pinned layer 330 and a SAF shield AFM layer 332. Because, in some embodiments, sensor 302 utilizes soft side shields 322, SAF shield reference layer 326 needs to have a relatively fixed magnetization to assist in stabilizing the magnetizations of side shields 322. Thus, AFM layer 332 needs to pin the magnetization of layer SAF shield pinned layer 330 substantially parallel to the bearing surface, which results in the relatively fixed magnetization of SAF shield reference layer 326 due to antiferromagnetic coupling across SAF shield separation layer 328 and thus in stabilizing the magnetizations of the side shields 322 substantially parallel to the bearing surface as well. SAF shield reference layer 326 and SAF shield pinned layer 330 may be formed of a soft magnetic material (for example, an alloy comprising Ni and Fe). It should be noted that, instead of employing SAF shielding structure 314, side shields 322 may be stabilized by shape anisotropy, by employing hard magnetic layers adjacent to the soft magnetic layers within side shield 322, or by any other suitable technique.

In some embodiments, sensor 302 may utilize tunnel magnetoresistance (TMR) or giant magnetoresistance (GMR) effects. In embodiments that utilize TMR effects, spacer layer 308 is a tunneling barrier layer that separates the SAF structure 306 from the free layer 310. The tunneling barrier layer 308 is sufficiently thin that quantum mechanical electron tunneling occurs between a reference layer 320 in the SAF structure 306 and the free layer 310. The electron tunneling is electron-spin dependent, making the magnetic response of the magnetoresistive sensor 302 a function of the relative orientations and spin polarizations of the SAF structure 306 and the free layer 310. The highest probability of electron tunneling occurs when the magnetic moments of the SAF structure 306 and the free layer 310 are parallel, and the lowest probability of electron tunneling occurs when the magnetic moments of the SAF structure 306 and the free layer 310 are antiparallel. Accordingly, the electrical resistance of the magnetoresistive sensor 302 changes in response to an applied magnetic field. The data bits on the data discs in the disc drive may be magnetized in a direction normal to the plane of FIG. 3A, either into the plane of the figure, or out of the plane of the figure. Thus, when the magnetoresistive sensor 302 passes over a data bit, the magnetic moment of the free layer 310 is rotated either into the plane of FIG. 3A or out of the plane of FIG. 3A, changing the electrical resistance of the magnetoresistive sensor 302. The value of the bit being sensed by the magnetoresistive sensor 302 (for example, either 1 or 0) may therefore be determined based on the current flowing from a first electrode (not shown) to a second electrode (not shown) connected to the magnetoresistive sensor 302.

FIG. 3B is a schematic block diagram illustrating an example read head 350 including multiple magnetoresistive sensors (for example, 302A and 302B) stacked along a track direction (i.e., the z-direction in FIG. 3B). In some embodiments, sensors 302A and 302B in read head 350 may be isolated from each other by isolation layer 324, which is present in a region between sensors 302A and 302B in FIG. 3B. Each of sensors 302A and 302B is generally similar to sensor 302 of FIG. 3A and therefore a description of individual sensors 302A and 302B is not provided in connection with FIG. 3B.

As indicated earlier, in a dual-sensor reader of the type shown in FIG. 3B and in a single-sensor reader of the type shown in FIG. 3A, SNR and PW50 are primary parameters controlling reader performance. However, design requirements for optimal/best SNR and optimal/best PW50 are often in conflict with each other, both in single and in dual-sensor readers. For example, to improve PW50, AFM 304 may be recessed behind the bearing surface in sensor 302 (of FIG. 3A) and in sensors 302A and 302B (of FIG. 302B). Having AFM 304 recessed behind the bearing surface would result in SAF PL 316 being directly in contact with its respective bottom shield 222, 305 at and near the bearing surface. Such a recessed AFM (rAFM) design would ensure better PW50, due to lower shield-to-shield spacing (SSS) but would also worsen SNR, due to extra noise resulting from the SAF 306 being unsupported at and near the bearing surface. As another example, to improve SNR, a substantially thick free layer (FL) 310 may be employed in sensor 302 (of FIG. 3A) and in sensors 302A and 302B (of FIGS. 3B and 3C). Having a higher FL 310 thickness improves SNR due to higher FL 310 volume, but results in degradation in PW50 due to higher SSS.

Embodiments of the disclosure provide a dual-sensor reader that has greater advantages than the individual advantages of either reader. As indicated above, to obtain such advantages, the dual-sensor reader includes two read sensors of different design: one designed to favor optimal SNR and the other to favor optimal PW50. Modeling experiments described below demonstrate that a dual-sensor reader having (1) a read sensor designed for better SNR and (2) a reader sensor designed for better PW50 has a better total performance than a dual-sensor reader including two sensors having the same design. The modeling setup is shown in Table 1 below.

TABLE 1

| Step | Read sensor 1 | Read sensor 2 | Combined (joint) eSNDR |
|---|---|---|---|
| 1 | SNR_A, CBD_A | SNR_A, CBD_A | eSNDR_MATCH |
| 2 | SNR_B, CBD_B | SNR_B, CBD_B | eSNDR_MATCH |
| 3 | SNR_A, CBD_B | SNR_B, CBD_A | eSNDR_MIX |

In Table 1 above, CBD (channel bit density)=PW50/Bit Length and eSNDR is equalized signal to (distortion+noise) ratio. The noise and distortion are from both the dual-sensor reader and from the media. In the modeling experiments, all simulations were carried out for a fixed media transition jitter of 7.5%.

Step 1 of the modeling method involves selecting SNR_A and CBD_A values for both read sensor 1 and read sensor 2. An eSNDR_MATCH for the combined performance of both read sensor 1 and read sensor 2 (dual-sensor reader) is calculated.

Step 2 of the modeling method involves selecting SNR_B to be different from SNR_A and determining a value of CBD_B that provides the same or substantially same eSNDR_MATCH value for the combined performance of both read sensors as SNR_A, CBD_A from step 1. Thus, if SNR_B is made worse than SNR_A, CBD_B must be made better than CBD_A, to make eSNDR of the two dual readers equal or substantially equal. SNR_B and CBD_B values are utilized for both readers.

Step 3 of the modeling method involves utilizing SNR_A, CBD_B for read sensor 1, and utilizing SNR_B, CBD_A for read sensor 2 of the dual-sensor reader. An eSNDR_MIX for the combined performance of both read sensor 1 and read sensor 2 is then calculated. DELTA_eSNDR=eSNDR_MIX−eSNDR_MATCH is then a gain in eSNDR for the combined performance of both read sensor 1 and read sensor 2 if the readers are mismatched (as in step 3) rather than matched (as in steps 1 and 2).

Figure 4A:
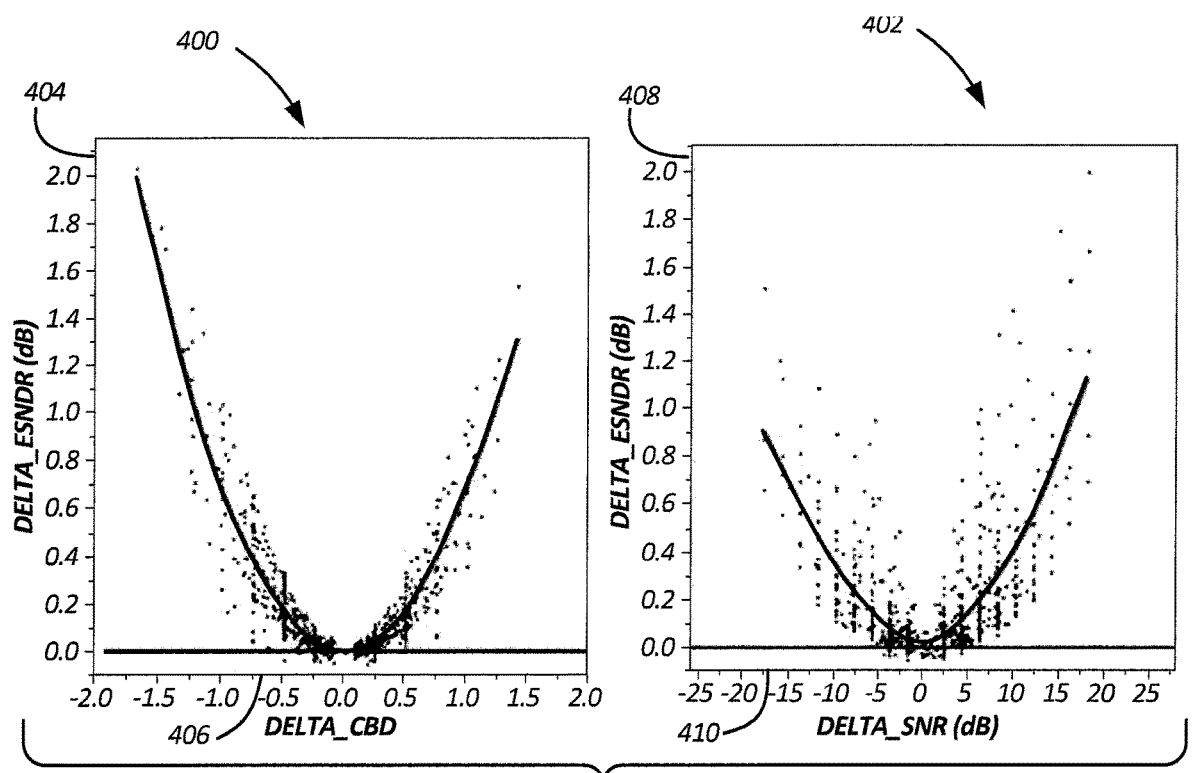
FIGS. 4A and 4B are plots of results obtained for dual-sensor readers.

FIG. 4A includes graphs illustrating DELTA_eSNDR values for different DELTA_CBD and DELTA_SNR values, respectively. Here, DELTA_eSNDR=eSNDR_MIX−eSNDR_MATCH−gain due to reader mixing in the dual reader, DELTA_SNR=SNR_A−SNR_B and DELTA_CBD=CBD_A−CBD_B. In a first graph 400 on the left side of FIG. 4A, a vertical axis 404 represents DELTA_eSNDR in decibels (dB) and a horizontal axis 406 represents DELTA_CBD. In a second graph 402 on the right side of FIG. 4A, a vertical axis 408 represents DELTA_eSNDR in dB and a horizontal axis 410 represents DELTA_SNR in dB.

Figure 4B:
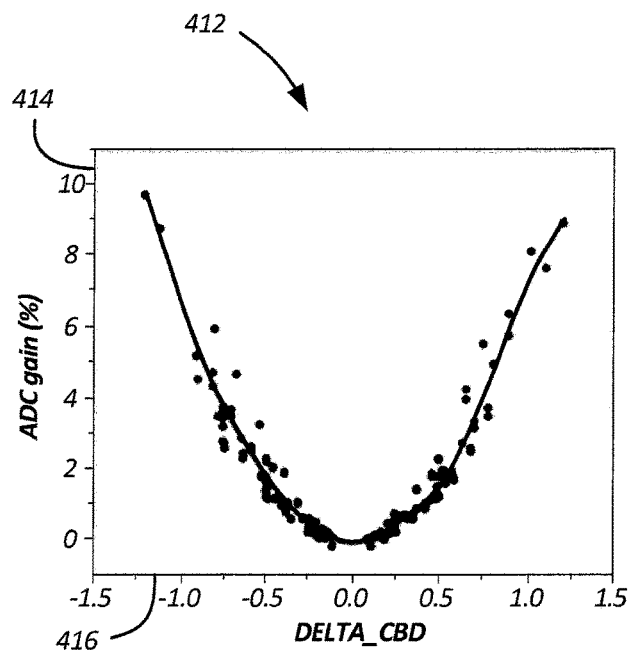

The eSNDR gain is translated to bit error rate (BER) gain (using a "Universal" BER vs. eSNDR curve) and finally to areal density capability (ADC) gain using an empirical relation 0.1 dec BER gain=1.5% ADC gain. FIG. 4B is a graph 412 based on these calculations. Graph 412 shows ADC gain due to mixing of read sensors in a dual-sensor reader. In FIG. 4B, a vertical axis 414 represents ADC gain % and a horizontal axis 416 represents DELTA_CBD. From FIGS. 4A and 4B, it is seen that the hybrid dual-sensor reader design increases eSNDR and ADC.

The data for the graphs in FIGS. 4A and 4B was obtained using a MISO (Multiple Input Single Output) model. A MIMO (Multiple Input Multiple Output) model should provide an even stronger advantage to the hybrid dual reader setup by keeping the different information flows from the two readers separate further into the data detection process. Different embodiments of hybrid dual readers are described below in connection with FIGS. 5-7B.

Figure 5:
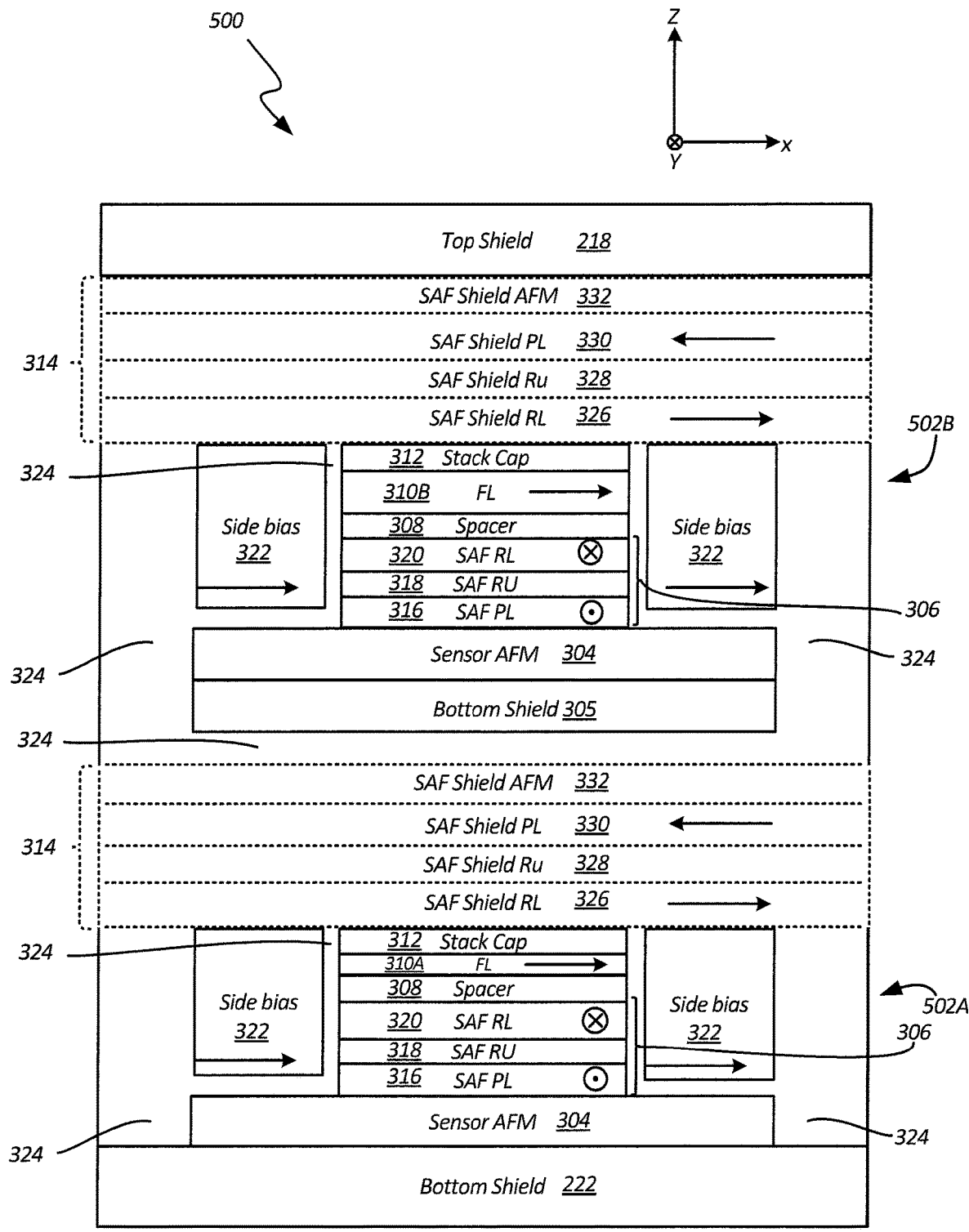
FIG. 5 is a bearing surface view of a hybrid dual reader in accordance with one embodiment.

FIG. 5 is a schematic block diagram illustrating an example hybrid dual read head 500 including multiple magnetoresistive sensors (for example, 502A and 502B) stacked along a track direction (i.e., the z-direction in FIG. 3B). In some embodiments, sensors 502A and 502B in sensor 500 may be isolated from each other by isolation layer 324, which is present in a region between sensors 502A and 502B in FIG. 5. Each of sensors 502A and 502B is similar to sensor 302 of FIG. 3A and therefore a description of individual sensors 502A and 502B is not provided in connection with FIG. 5. However, sensors 502A and 502B of hybrid dual read head 500 include conflicting design characteristics. Specifically, read sensor 502A includes a pulse width favoring design characteristic, and read sensor 502B includes a SNR favoring design characteristic. The SNR favoring design characteristic is in conflict with the pulse width favoring design characteristic. In the embodiment of FIG. 5, the pulse width favoring design characteristic is a substantially thin free layer 310A in sensor 502A. The SNR favoring design characteristic is a substantially thick free layer 310B in sensor 502B. In some embodiments, the substantially thick free layer 310B is between about 20%-150% thicker than the substantially thin free layer 310A. Further, in some embodiments, a thickness of the substantially thin free layer 310A is between about 2 and 10 nanometers.

Figure 6A:
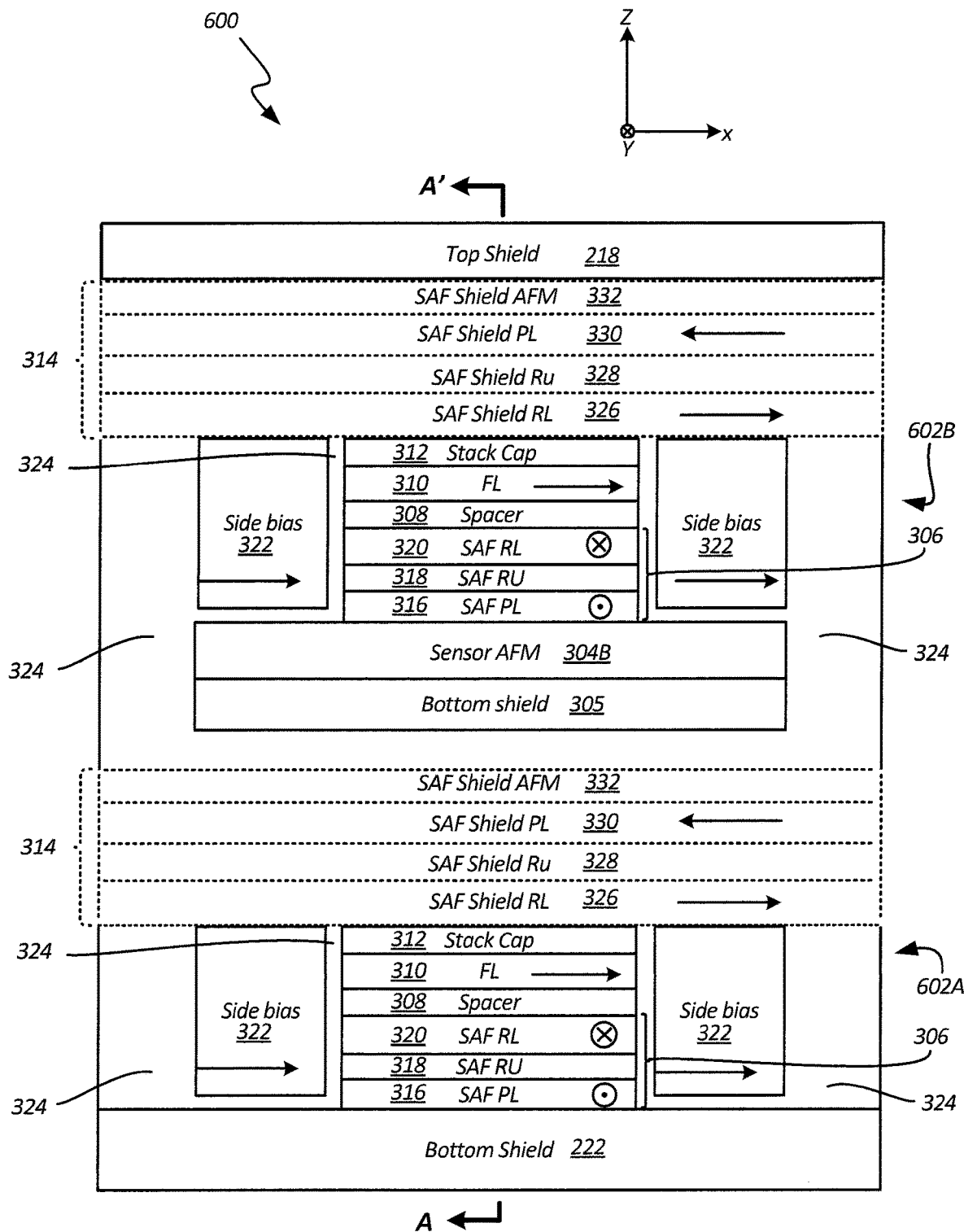
FIG. 6A is a bearing surface view of a hybrid dual reader in accordance with another embodiment.
Figure 6B:
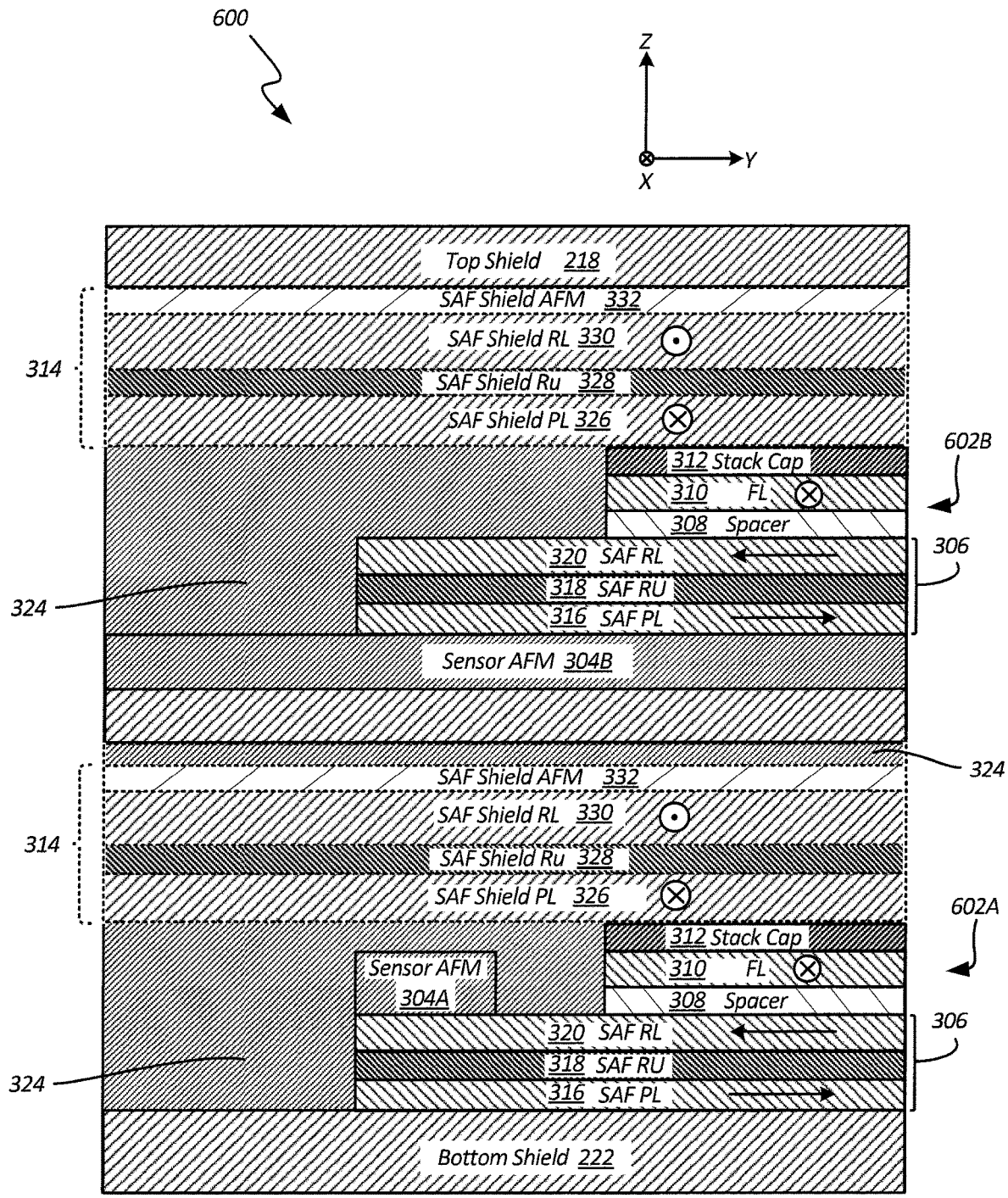
FIG. 6B is a sectional view of the hybrid dual reader of FIG. 6A.

FIG. 6A is a bearing surface view of a hybrid dual read head 600 in accordance with another embodiment. FIG. 6B is a cross-sectional view of hybrid dual read head 600 of FIG. 6A through a plane orthogonal to the bearing surface and the layers of the sensor stack (along line A-A' shown in FIG. 6A). As in the case of the embodiment of FIG. 5, hybrid dual read head 600 includes read sensors with conflicting design characteristics. In hybrid dual read head 600, the pulse width favoring design characteristic is a rAFM layer 304A in read sensor 602A. As noted above, such a rAFM design would ensure better PW50, due to lower SSS but would also worsen SNR, due to extra noise resulting from the SAF 306 being unsupported at and near the bearing surface. The SNR favoring design characteristic in sensor 602B is an AFM layer 304B positioned at the bearing surface. In contrast with rAFM layer 304A in read sensor 602A, AFM layer 304B supports SAF structure 306 in sensor 602B at and near the bearing surface.

Figure 7A:
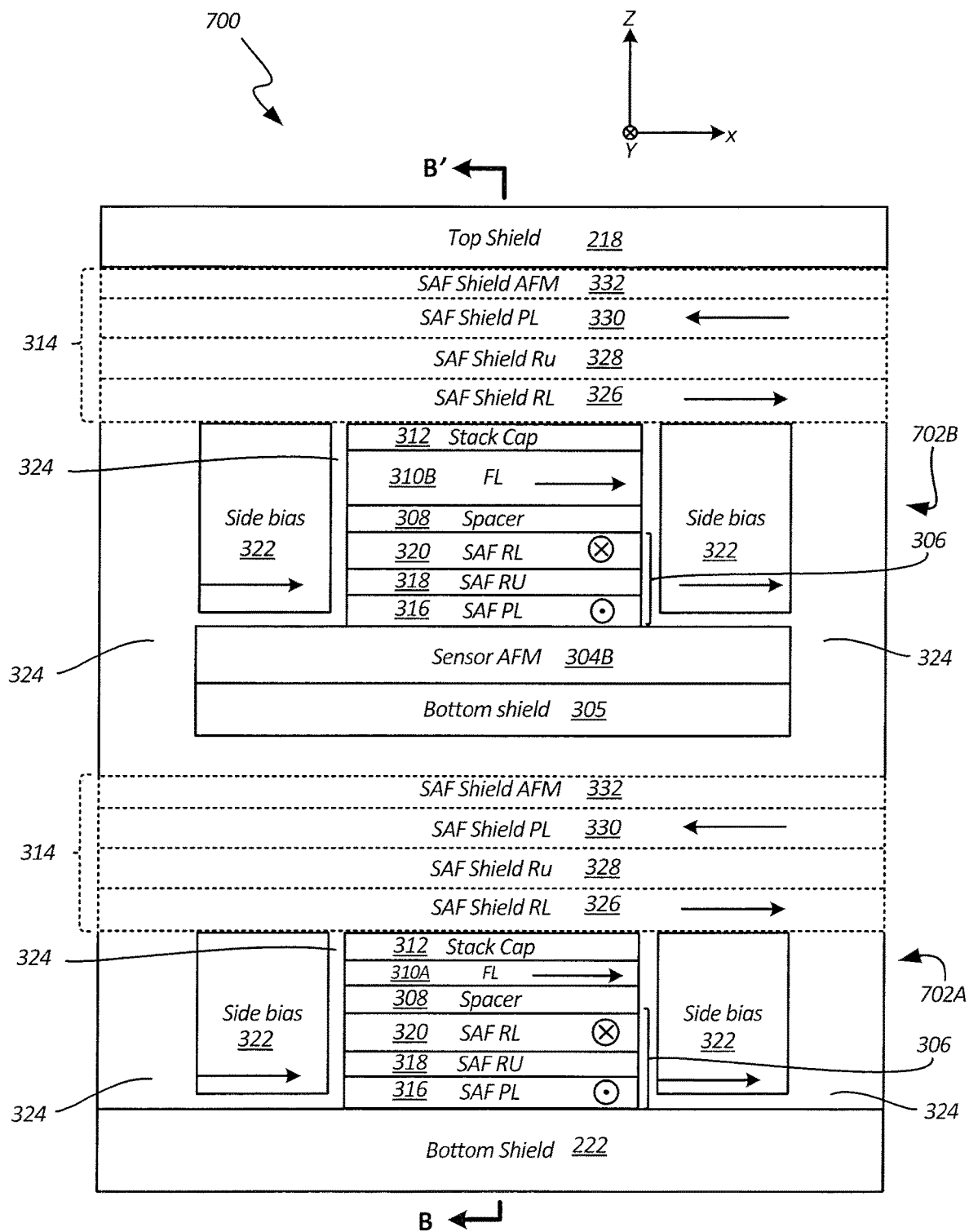
FIG. 7A is a bearing surface view of a hybrid dual reader in accordance with yet another embodiment.
Figure 7B:
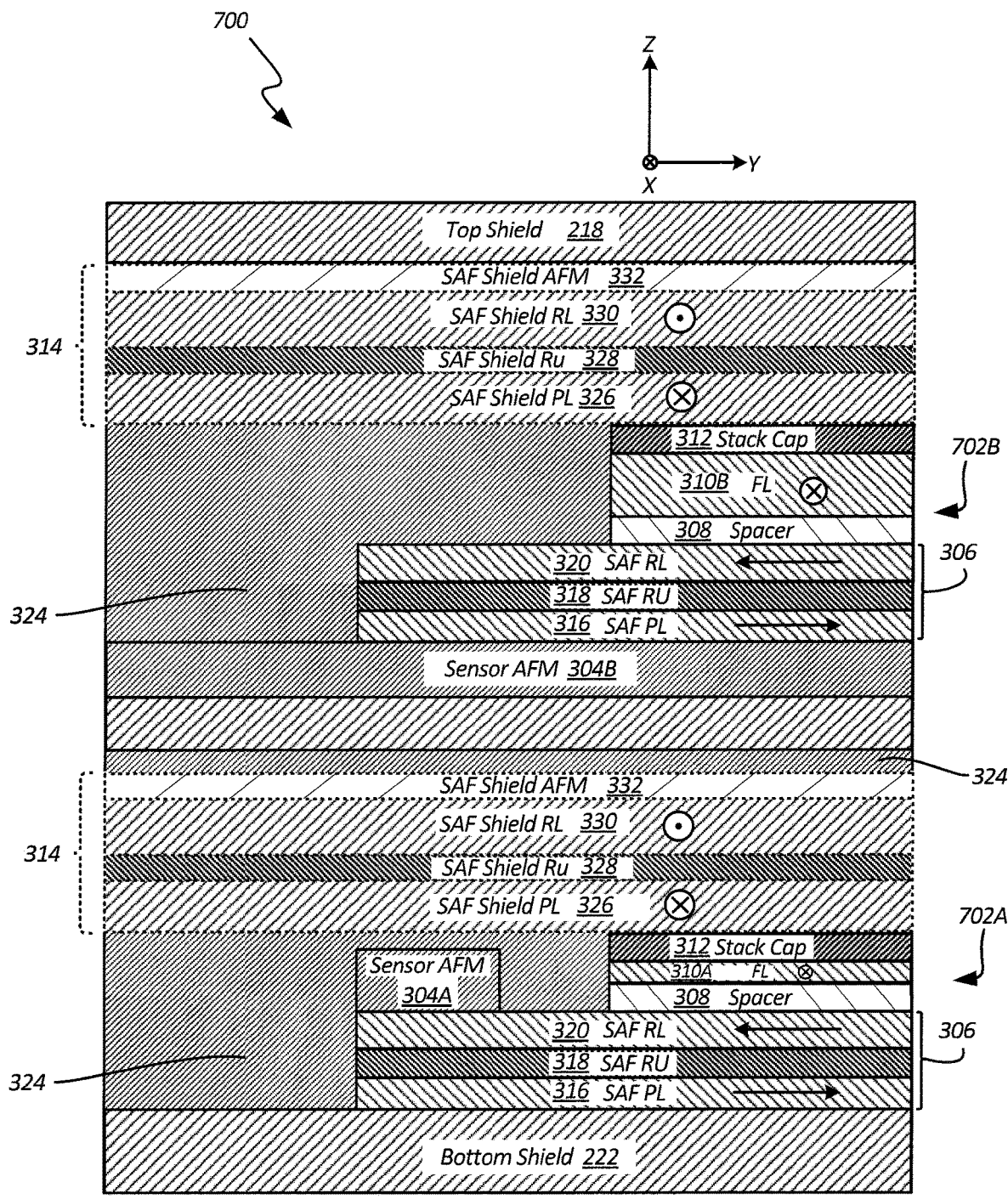
FIG. 7B is a sectional view of the hybrid dual reader of FIG. 7A.

FIG. 7A is a bearing surface view of a hybrid dual read head 700 in accordance with yet another embodiment. FIG. 7B is a cross-sectional view of hybrid dual read head 700 of FIG. 7A through a plane orthogonal to the bearing surface and the layers of the sensor stack (along line B-B' shown in FIG. 7A). Hybrid dual read head 700 includes read sensor 702A that has pulse width favoring design characteristics from both sensor 502A (of FIG. 5) and sensor 602A (of FIGS. 6A and 6B). Also, hybrid dual read head 700 includes sensor 702B that has SNR favoring design characteristics from both sensor 502B (of FIG. 5) and sensor 602B (of FIGS. 6A and 6B). In the interest of brevity, a description of the pulse width favoring and SNR favoring design characteristics is not repeated. It should be noted that, instead of both sensors 702A and 702B including two pulse width favoring characteristics and two SNR favoring design characteristics, sensor 702A, for example, may include one pulse width favoring design characteristic and sensor 702B may include two SNR favoring design characteristics. In general, any suitable combination of pulse width favoring and SNR favoring design characteristics may be employed as long as one sensor favors SNR and the other sensor favors pulse width.

Figure 8A:
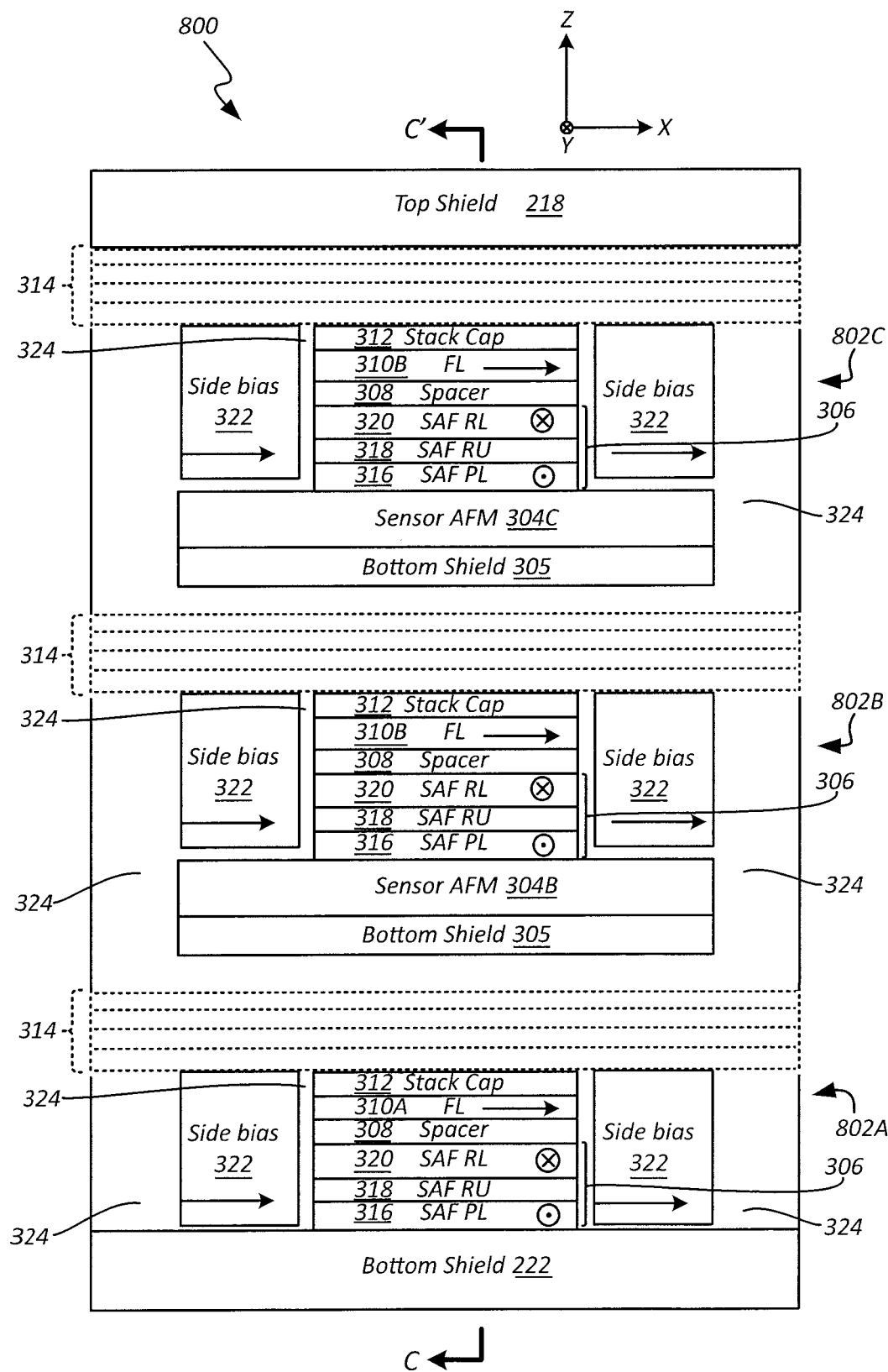
FIG. 8A is a bearing surface view of a hybrid multi-sensor reader in accordance with one embodiment.
Figure 8B:
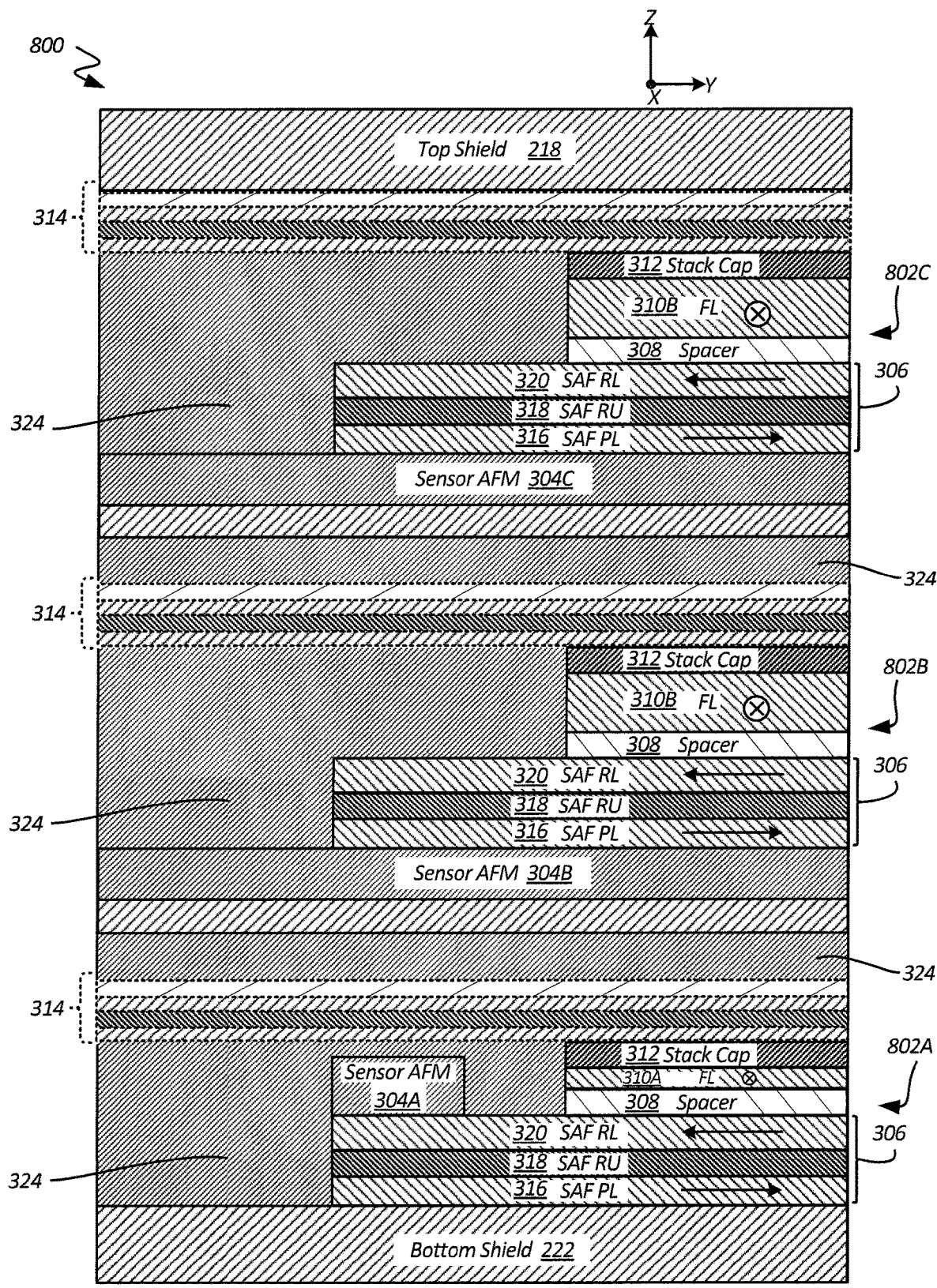
FIG. 8B is a sectional view of the hybrid multi-sensor reader of FIG. 8A.

FIG. 8A is a bearing surface view of a hybrid multi-sensor read head 800. FIG. 7B is a cross-sectional view of hybrid multi-sensor read head 800 of FIG. 8A through a plane orthogonal to the bearing surface and the layers of the sensor stack (along line C-C' shown in FIG. 7B). Hybrid multi-sensor read head 800 includes read sensor 802A that has pulse width favoring design characteristics from both sensor 502A (of FIG. 5) and sensor 602A (of FIGS. 6A and 6B). Also, hybrid multi-sensor read head 800 includes sensors 802B and 802C that have SNR favoring design characteristics from both sensor 502B (of FIG. 5) and sensor 602B (of FIGS. 6A and 6B). Sensor AFM 304C of sensor 802C is similar to sensor AFM 304B of sensor 802B. In general, hybrid multi-sensor read head embodiments may include any suitable number of sensors, with at least one sensor having a pulse width favoring design characteristic and another sensor having a SNR favoring design characteristic.

Figure 9:
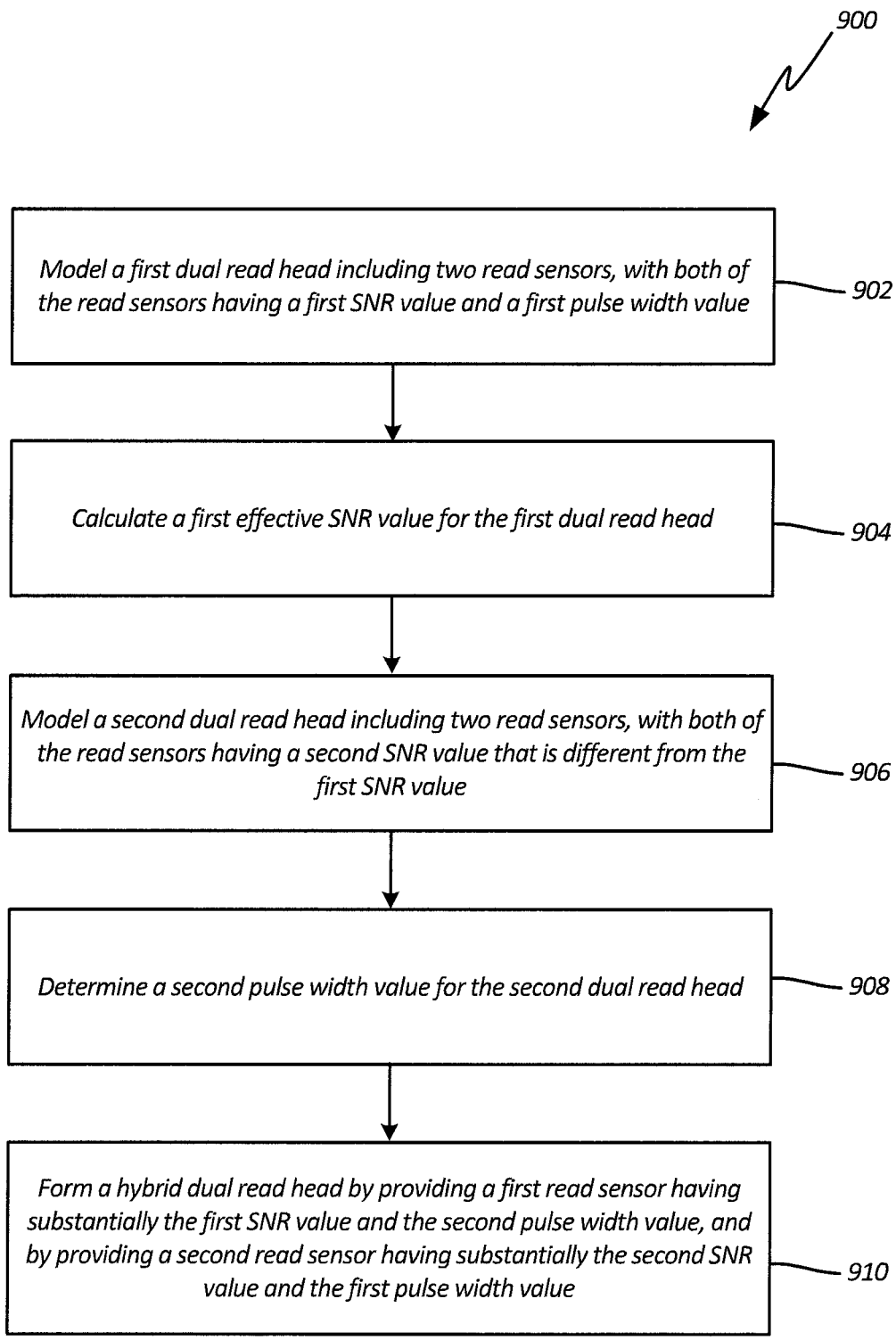
FIG. 9 is a flowchart of a method embodiment.

FIG. 9 is a simplified flow diagram 900 of a method embodiment. Step 902 of the method involves modeling a first dual read head including two read sensors, with both of the read sensors having a first SNR value and a first pulse width value. At step 904, a first effective SNR value for the first dual read head is calculated. Step 906 involves modeling a second dual read head including two read sensors, with both of the read sensors having a second SNR value that is different from (e.g. lower than) the first SNR value. At step 908, a second pulse width value is determined for the second dual read head. The second pulse width value and the second SNR value enable the second dual read head to produce a second effective SNR value that is substantially equal to the first effective SNR value. At step 910, a hybrid dual read head is formed by providing a first read sensor having substantially the first SNR value and the second pulse width value, and by providing a second read sensor having substantially the second SNR value and the first pulse width value.

It should be noted that, in different embodiments described above, the two or more read sensors included in the read head always operate simultaneously rather than being selectively enabled in the drive.

Although various examples of conflicting design characteristics within multiple sensor magnetic reproducing devices are disclosed in the application, embodiments are not limited to the particular characteristics disclosed in the application. It is to be understood that even though numerous characteristics and advantages of various embodiments of the disclosure have been set forth in the foregoing description, together with details of the structure and function of various embodiments of the disclosure, this disclosure is illustrative only, and changes may be made in detail, especially in matters of structure and arrangement of parts within the principles of the present disclosure to the full extent indicated by the broad general meaning of the terms in which the appended claims are expressed. For example, the particular elements may vary depending on the particular application for the dual/multiple sensor magnetic reproducing device with the conflicting design characteristics while maintaining substantially the same functionality without departing from the scope and spirit of the present disclosure. In addition, although the embodiments described herein are directed to a particular type of multiple sensor magnetic reproducing device utilized in a particular data storage system, it will be appreciated by those skilled in the art that the teachings of the present disclosure can be applied to other data storage devices without departing from the scope and spirit of the present disclosure.

What is claimed is:

1. A read head comprising:
   first and second read sensors with conflicting design characteristics,
   the first read sensor comprises at least one signal-to-noise ratio favoring design characteristic and a first free layer, and
   the second read sensor comprises at least one pulse width favoring design characteristic and a second free layer that is not magnetically coupled to the first free layer of the first read sensor, and
   the first and second free layers are stacked one above the other, and
   the first and second free layers have substantially same widths, and
   the at least one signal-to-noise ratio favoring design characteristic is in conflict with the at least one pulse width favoring design characteristic, and
   the at least one signal-to-noise ratio favoring design characteristic comprises the first free layer being a substantially thick free layer, and
   the at least one pulse width favoring design characteristic comprises the second free layer being a substantially thin free layer.

2. The read head of claim 1 and wherein the substantially thick first free layer is between about 20%-150% thicker than the substantially thin second free layer.

3. The read head of claim 1 and wherein a thickness of the substantially thin second free layer is between about 2 and 10 nanometers.

4. The read head of claim 1 and further comprising a bearing surface, and wherein the at least one signal-to-noise ratio favoring design characteristic comprises a first antiferromagnetic (AFM) layer positioned at the bearing surface, and wherein the first AFM layer supports a first synthetic antiferromagnetic (SAF) structure of the first read sensor at the bearing surface, and wherein the at least one pulse width favoring design characteristic comprises a second AFM layer recessed behind the bearing surface such that a second SAF structure of the second read sensor is unsupported, at the bearing surface, by the second AFM layer.

5. The read head of claim 1 and comprising a plurality of read sensors greater than two including the first and second read sensors with conflicting design characteristics, and wherein at least one of the plurality of read sensors comprises the at least one signal-to-noise ratio favoring design characteristic, and at least one of the plurality of read sensors comprises the at least one pulse width favoring design characteristic.

6. A read head comprising:
   a bearing surface;
   first and second read sensors with conflicting design characteristics,
   the first read sensor comprises at least one signal-to-noise ratio favoring design characteristic that comprises:
      a substantially thick free layer; and
      a first AFM layer positioned at the bearing surface, the first AFM layer supports a first SAF structure of the first read sensor at the bearing surface, and
   the second read sensor comprises at least one pulse width favoring design characteristic that comprises:
      a substantially thin free layer; and
      a second AFM layer recessed behind the bearing surface such that a second SAF structure of the second read sensor is unsupported, at the bearing surface, by the second AFM layer, and
   the at least one signal-to-noise ratio favoring design characteristic is in conflict with the at least one pulse width favoring design characteristic.

7. The read head of claim 6 and wherein the substantially thick free layer is between about 20%-150% thicker than the substantially thin free layer.

8. The read head of claim 7 and wherein a thickness of the substantially thin free layer is between about 2 and 10 nanometers.

9. A read head comprising:
   a bearing surface;
   first and second read sensors with conflicting design characteristics,
   the first read sensor comprises:
      at least one signal-to-noise ratio favoring design characteristic that comprises a first antiferromagnetic (AFM) layer positioned at the bearing surface, with the first AFM layer supporting a first synthetic antiferromagnetic (SAF) structure of the first read sensor at the bearing surface; and
      a first free layer; and
   the second read sensor comprises:
      at least one pulse width favoring design characteristic that comprises a second AFM layer recessed behind the bearing surface such that a second SAF structure of the second read sensor is unsupported, at the bearing surface, by the second AFM layer; and
      a second free layer that is not magnetically coupled to the first free layer of the first read sensor, and
   the at least one signal-to-noise ratio favoring design characteristic is in conflict with the at least one pulse width favoring design characteristic.

10. The read head of claim 9 and wherein the first read sensor is one of a first plurality of read sensors in the read head, and wherein each sensor of the first plurality of read sensors comprises the at least one signal-to-noise ratio favoring design characteristic.

11. The read head of claim 9 and wherein the first read sensor is configured to produce a first readback signal, and the second read sensor is configured to produce a second readback signal.

* * * * *